United States Patent [19]

Ozaki

[11] Patent Number: 5,987,093
[45] Date of Patent: Nov. 16, 1999

[54] MEDICAL IMAGE FORMING APPARATUS

[75] Inventor: Masahiro Ozaki, Tokyo, Japan

[73] Assignee: Kabushiki Kaisha Toshiba, Kawasaki, Japan

[21] Appl. No.: 08/957,581

[22] Filed: Oct. 24, 1997

[30] Foreign Application Priority Data

Oct. 24, 1996 [JP] Japan .................................. 8-282575

[51] Int. Cl.⁶ ...................................................... A61B 6/03
[52] U.S. Cl. ................................ 378/62; 378/8; 378/901
[58] Field of Search ............................ 378/4, 8, 62, 901; 382/131

[56] References Cited

U.S. PATENT DOCUMENTS

5,459,769  10/1995  Brown ........................................... 378/4
5,640,462  6/1997  Sato et al. ................................. 382/131

*Primary Examiner*—David Vernon Bruce
*Attorney, Agent, or Firm*—Oblon, Spivak, McClelland, Maier & Neustadt, P.C.

[57] ABSTRACT

X-ray detectors of an X-ray CT apparatus provides photographing image data to a medical image forming apparatus. When data for setting a region-of-interest ("ROI") image and CT values of bones are provided through an input data entry unit of the medical image forming apparatus, a system control unit controls a tomographic image reconstruction unit in such a way that the latter eliminates pixels with the CT values from the ROI image. The reconstruction unit provides the same to a monitor unit through a display control unit. The ROI tomographic image is converted into a blood-vessel emphasized tomographic image. A clear ROI image can be obtained for portions even complicatedly tangled with bones and vessels, such as a human head or the like.

18 Claims, 9 Drawing Sheets

PRIOR TO CONTRAST MEDIUM INJECTION

FIG.8(a)

AFETER CONTRAST MEDIUM INJECTION

MEDICAL IMAGE FORMING APPARATUS

BACKGROUND OF THE INVENTION

1. Field of the Invention

The present invention generally relates to a medical image forming apparatus for forming images in a region of interest from medical images of a computer tomography (CT) apparatus, a magnetic resonance imaging (MRI) apparatus, an X-ray photographing apparatus or the like. More particularly, the present invention relates to a medical image forming apparatus which is capable of forming definite images in a region of interest from ones tangled with bones and blood vessels in a human head or the like.

2. Discussion of the Background

In an X-ray CT apparatus which irradiates X-rays toward an examined body and photographs a tomographic image thereof, a preliminary scanning operation (called hereinafter "a pre-scan") may be carried out to judge whether or not a contrast medium reaches a photographing object portion (blood vessels, etc.). Such an X-ray apparatus is disclosed in U.S. Pat. Nos. 5,459,769 entitled "Procedure for Monitoring Contrast Agent Application in a CT Imaging System" issued to Barry D. Brown on Oct. 17, 1995 and U.S. Pat. No. 5,612,985 entitled "Computer Tomography Apparatus" issued to Yusuke Toki et al. on Mar. 11, 1997.

Figure 1:
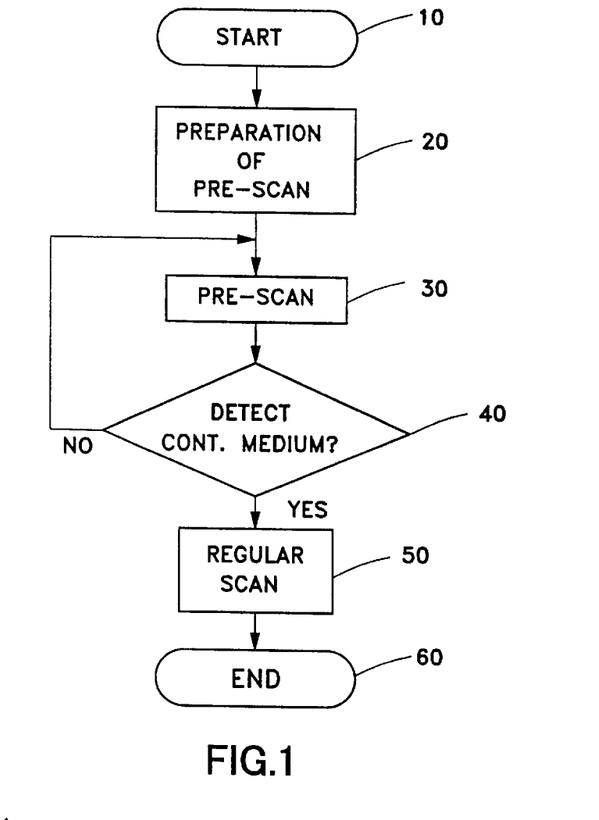
FIG. 1 is an operation flow chart of a medical image forming apparatus.

A series of operations is briefly shown in a flow chart: of FIG. 1. After a start operation 10 the X-ray CT apparatus executes a pre-scan preparation step 20. In this step, the apparatus is initialized and a predetermined level of X-ray exposure is set therein. Images to be scanned are photographer in response to the X-ray irradiation from the apparatus toward a subject body. The images are displayed on a monitor unit. An operator observes them carefully and determines an image at an appropriate place as a reference image Alternatively, if such images have been already stored in a recording unit through a previously diagnosed operation, the operator may select from them a CT image at a place suitable for a diagnostic purpose as the reference image. While observing the reference image, he or she manipulates a keyboard to set up a region-of-interest (called hereinafter "a ROI") in the reference image displayed on the monitor unit. This ROI is set to surround contrast medium observing regions with a circular frame, for instance. After determination of the reference image, a contrast medium is injected into a blood vessel of the subject body. The pre-scan 30 is then performed.

In this case, the operator checks the contrast medium by observing images in the ROI at a step 40 and instructs the X-ray CT apparatus at a start of an ordinary scan 50 to photograph CT images when he or she confirms that the medium has fully reached diagnostic portions. Thus, CT images useful for diagnosis are obtained because photographs thereof can be taken in such a preferable situation that the contrast medium has completely come to the diagnostic portions. The X-ray CT apparatus then ends its operations at a step 60.

Such confirmation of the contrast medium by means of the pre-scan is relatively easy in the case that a ROI is set up at rather larger blood vessels, e.g., abdominal aortas. However, confirmation is quite difficult for head portions, e.g., where bones and blood vessels are complicatedly located.

In the case of such head portions including complicated bones and blood vessel s, a CT value indicative of an X-ray absorption rate for each substance is almost the same and images set up in the ROI are gray in color as a whole. Fine blood vessels in the vicinity of bones, such as internal carotid arteries, are hardly displayed as images in the ROI. Thus, it is very difficult to check the contrast medium.

SUMMARY OF THE INVENTION

Accordingly, one object of the present invention is to overcome the above-mentioned technical problems. Another object of the present invention is to provide a medical image forming apparatus which is capable of forming clear images in a ROI even at portions where bones and blood vessels in a human head or that like are complex.

A medical image forming apparatus according to the prevent invention includes a display device for displaying diagnostic images, a means for setting up a ROI in the diagnostic images for observation, a threshold means for setting up a threshold value to eliminate unnecessary images from the ROI and a means for forming modified images to be displayed on the display device.

An operator observes the density of a contrast medium in the modified images in the ROI to be displayed during a preliminary scanning (pre-scan). The operator instructs an image-pick-up device (or a photographing device) at a start of a regular scanning (regular-scan) so a density of the contrast medium becomes a predetermined condition. Upon receiving that instruction, a control device controls the image-pick-up device to photograph an object with ordinary intensity X-rays.

Since unnecessary images are removed from ROI images in the medical image forming apparatus of the present invention, it can provide clear resultant ROI images of portions where even bones and blood vessels in the head or the like are complicatedly located, and an injected contrast medium can be precisely detected.

Photographing at the pre-scan can be carried out through less quantity exposed X-rays than the regular-scan. Since the contrast medium can be precisely detected, the regular-scan is also carried out with a minimum requirement quantity of X-rays. As a result, an X-ray quantity to which a patient is exposed can be substantially reduced and a safety of the medical image forming apparatus is significantly improved.

The above-stated and other objects and technical features of this invention will become apparent from the following description when taken with the accompanying drawings. It will be understood, however, that the drawings are for purposes of illustration and are not to be construed as defining the scope of the invention, reference being had for the latter purposes to the claims appended hereto.

BRIEF DESCRIPTION OF THE DRAWINGS

A more complete appreciation of the invention and many of the attendant advantages thereof will be readily obtained as the same becomes understood by reference to the following detailed description when considered in connection with the accompanying drawings, wherein.

DESCRIPTION OF THE PREFERRED EMBODIMENT

Preferred embodiments of medical image forming apparatus in accordance with the present invention will be described hereinbelow with reference to the drawings.

A medical image forming apparatus according to the present invention is applicable to an X-ray CT apparatus. It is a so-called third generation X-ray CT apparatus (i.e the rotation-rotation system) in which, for example, X-ray tubes and X-ray detectors opposite thereto are rotably provided in a rig-like gantry.

When CT images of a subject body are photographed in this X-ray CT apparatus, the body on a carrier plate is positioned on a central axis of the gantry. The X-ray tubes are driven to irradiate X-rays toward the subject body a plurality of times at regular intervals at every rotation of the X-ray tubes and the X-ray detectors along an internal diameter of the gantry. The X-ray detectors detect X-rays penetrating through the body at every X-ray exposure. One CT image is reconstructed in accordance with a plurality of output data detected with the X-ray detectors during every one rotation period and such a reconstructed CT image is displayed on a display device.

Such photographing of the body on the carrier plate, is repeatedly carried out as the body is gradually moved along the central axis of the gantry so that a plurality of CT images thereof may be obtained in response to such movement intervals (helical scanning CT images). Therefore, an operator may observe changes due to disease in greater detail.

Figure 2:
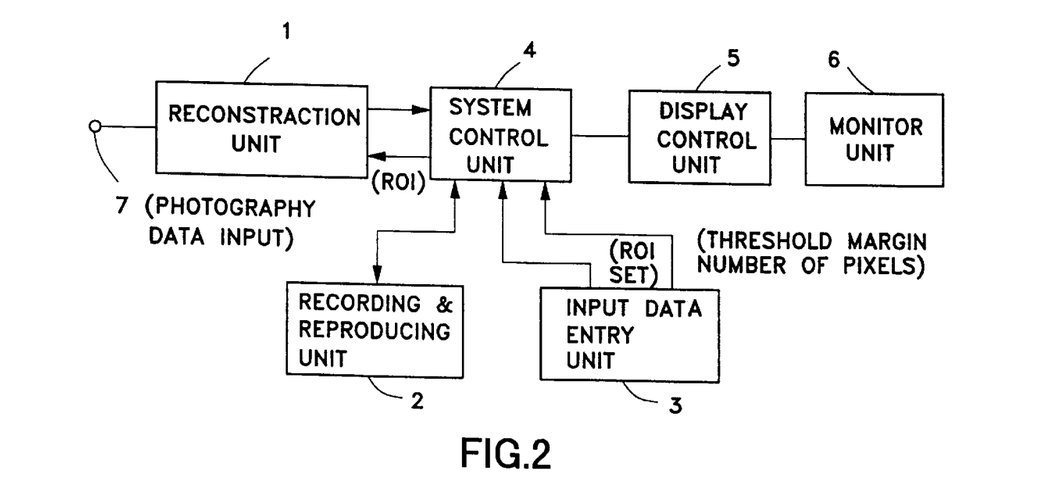
FIG. 2 is a block diagram of components of an X-ray, CT apparatus according to the present invention.

As shown in FIG. 2, an X-ray CT apparatus according to the present invention essentially includes an image reconstruction unit 1 to reconstruct a CT image of the subject body based upon photographing data detected with the X-ray detectors. A recording and reproducing unit 2, such as a magnetic disk unit, is provided to store the images reconstructed in the image reconstruction unit 1. These images may also read. An input data entry unit 3 is also provided to set up a ROI in CT images, input threshold data (i.e., CT values to eliminate unnecessary portions such as bones from the ROI), tolerable margins for CT values to comply with possible movement of the subject body, and the number of pixels under which the apparatus calculates and displays a ROI image.

The X-ray CT apparatus is further provided with a system control unit 4 to control overall operations of the X-ray CT apparatus, a display control unit 5 to control display of CT images reconstructed in the image reconstruction unit 1 and ROI images, and a monitor unit 6 to display the CT and ROI images under control of the display control unit 5.

Figure 3:
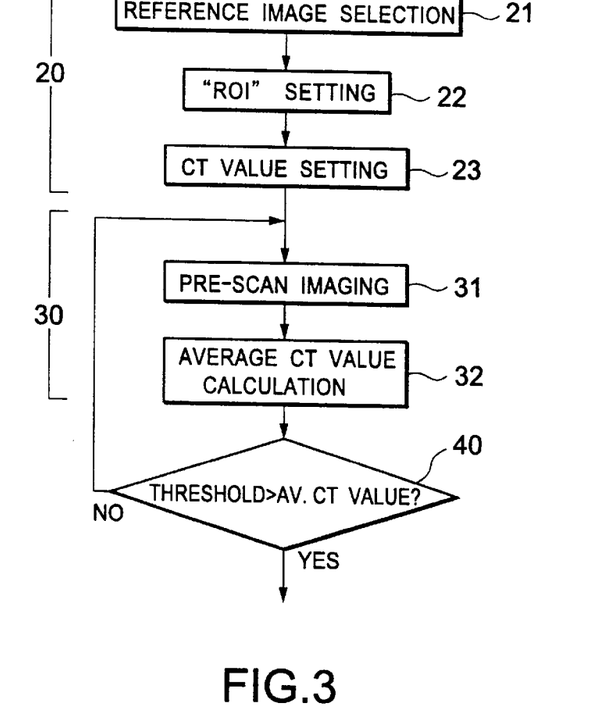
FIG. 3 is an operation flow chart of a medical image forming apparatus of this invention.

Operations of the X-ray CT apparatus will be explained hereinafter with further reference to FIG. 3.

When blood vessels situated in a human head, for instance, are diagnosed through CT images taken by the X-ray CT apparatus, a contrast medium is injected into a blood vessel to flow through internal carotid arteries of the head. In this particular case, a reference image selection step 21 is performed in advance for the pro-scan preparation stop 20 in advance. The operator chooses the reference image at a specific place suitable for a diagnostic purpose from images without contrast medium displayed on the monitor unit 6 as set forth above. There are two practical methods of selecting the reference image.

The first method is performed by irradiating an ordinary CT photographing level of X-rays toward a subject body. The X-rays penetrating through the subject are detected through X-ray detectors. Such detected outputs are supplied from the detectors to the image reconstruction unit 1 as photographing data. While observing them, the operator determines a reference place of an image among them. The image reconstruction unit 1 forms a CT image of the human head at the reference place in accordance with the photographic data and provides the same to the display control unit 5 through the system control unit 4. The display control unit 5 controls to display the reference images on the monitor unit 6. The display screen of the monitor unit 6 displays the CT image of the head as the reference one.

The second method is applicable to a case where CT images of the human head have been stored in the recording and reproducing unit 2. The operator manipulates the input data entry unit 3 to read them. Thus, the CT images are displayed on the monitor unit 6 in the same manner as set forth above. The operator determines the reference place suitable for diagnosis and the reference image thereat.

Figure 4:
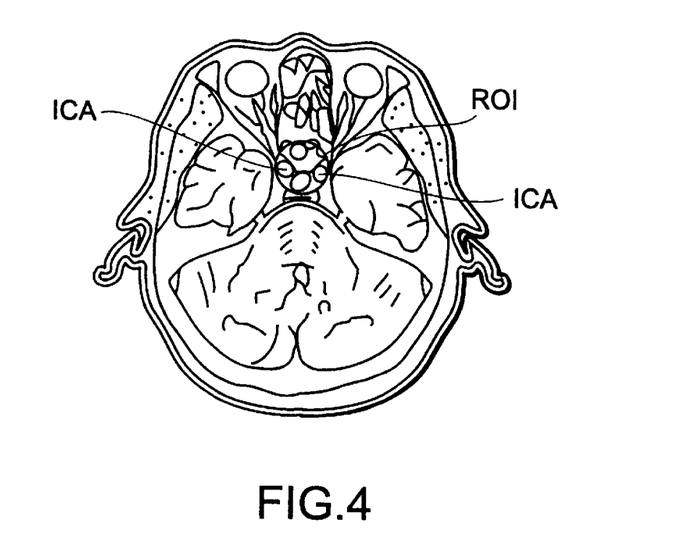
FIG. 4 shows a sectional view of a human head used for explanation of a ROI to be set up at a diagnostic portion thereof.

When the reference image is displayed on the monitor unit 6 in accordance with either the first or second method, the operator manipulates the input data entry unit 3 to set up a ROI which includes an internal carotid artery (ICA) in the reference images. After this ROI has in set up, the system control unit 4 controls the display control unit 5 to display a frame (e.g., a circular one) to surround the set-up ROI. This is shown in FIG. 4, in which the circular frame is displayed in such a way that it is overlapped with the reference images. Accordingly, the operator can recognize that the ROI has been set up in such a form that it includes the internal carotid arteries (ICA).

Since FIG. 4 is an anatomical chart of a laterally sliced head portion, the internal carotid arteries in the ROI appear to be easily recognizable. However, bones, blood vessels and the like in the ROI CT image have almost the same CT values, so the image displayed on the monitor unit 6 becomes entirely gray and it is quite difficult to confirm the internal carotid arteries (ICA).

Figure 7:
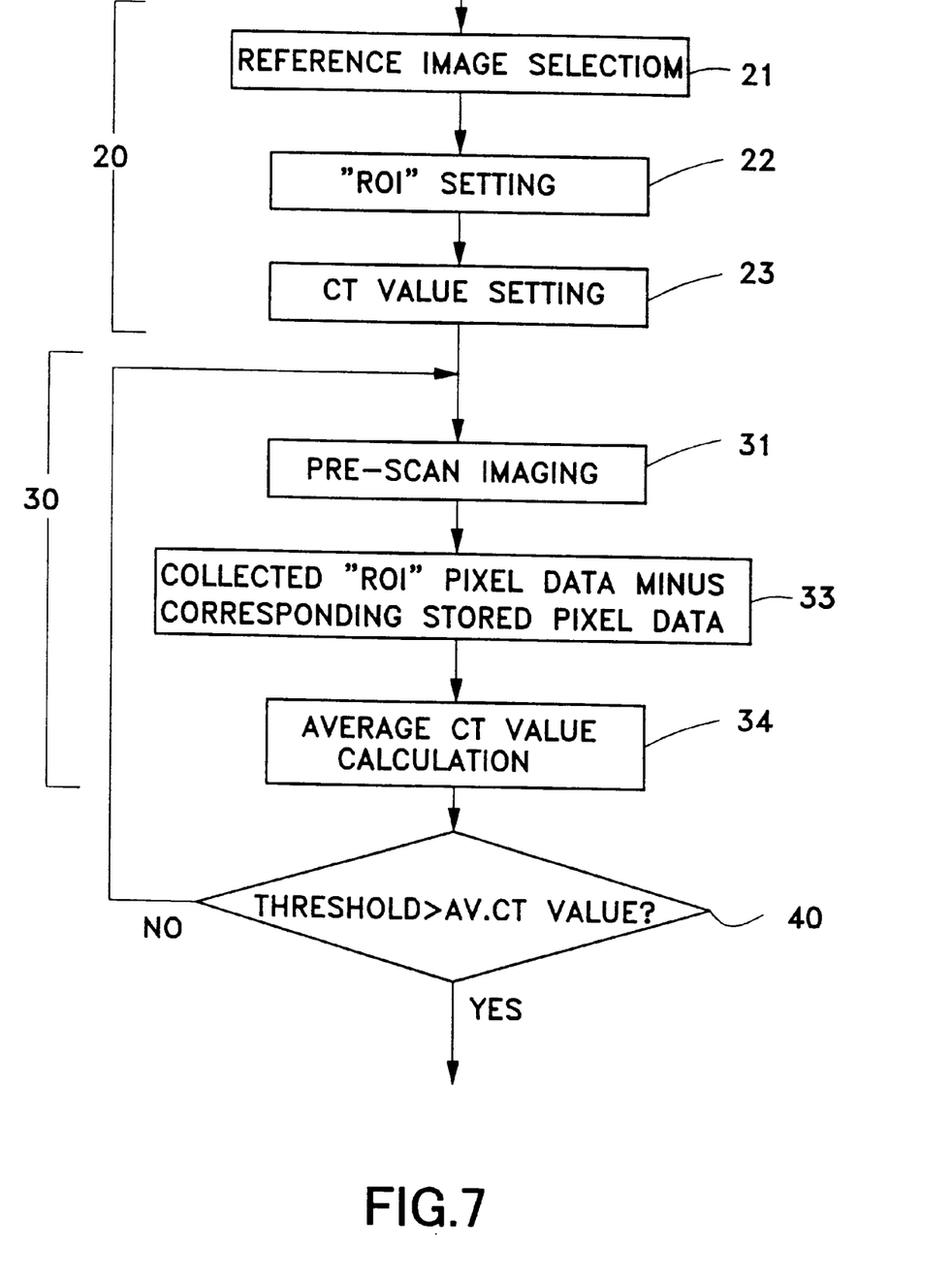
FIG. 7 is an operation flow chart of a modified embodiment according to the present invention.
Figure 8A:
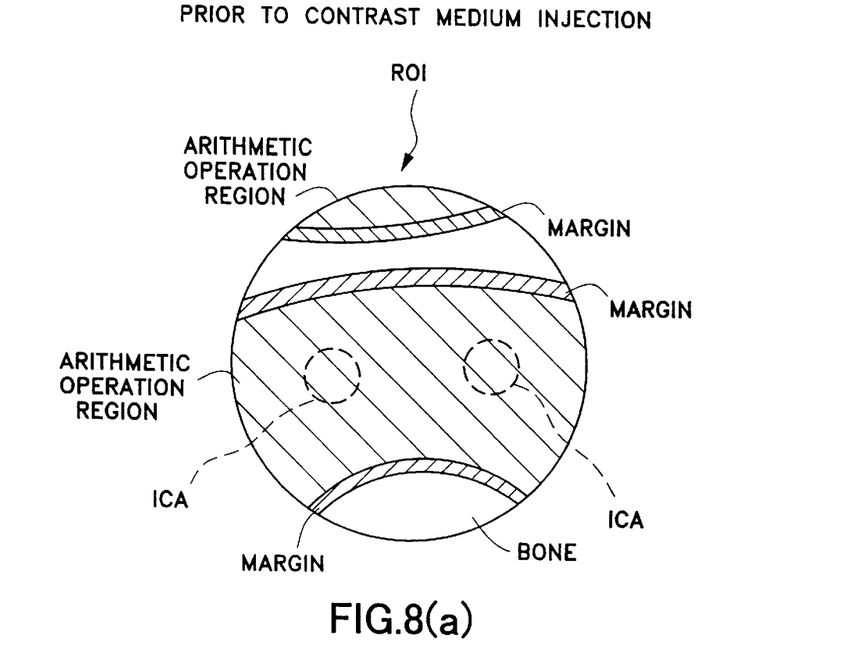
FIGS. 8(a) and 8(b) show situations that tolerable margins in consideration of a possible body movement are set up for CT values of bones in ROI CT images before and after injection of the contrast medium into the blood vessels, respectively.
Figure 8B:
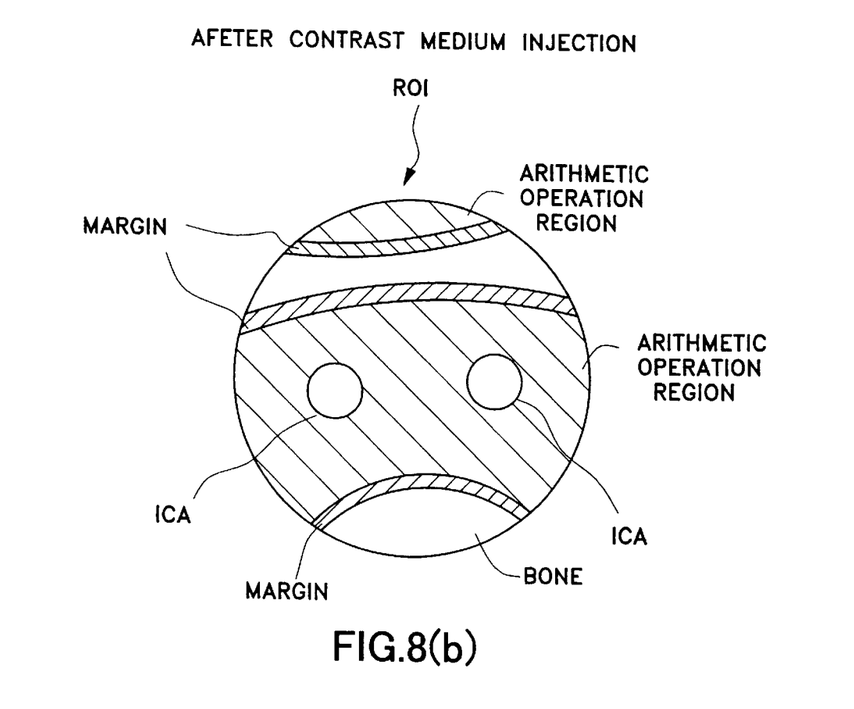

To overcome this difficulty the operator providers the system control unit 4, via the input data entry unit 3, with CT values of bones in the reference image at the operation 23 (FIG. 3) after the ROI has been set up. The CT value represents an X-ray absorption rate wherein water has a reference value of "0". Each organ, tissue or substance has its own inherent CT value. For example, water is "0", fat is "–100", blood is "16", and bones are in the range from "800 to 1,000". If bones and air, for instance, are designated as the upper and lower CT values, the bones and air are removed from a reference image to be displayed (for the sake of simplicity, only the bone image elimination is illustrated in FIG. 7).

When the system control unit 4 receives the CT values, of bones and air, the system control unit 4 provides threshold values by which the bones and air can be roved from the reference image and which are supplied to the image reconstruction unit 1. At the same time the irradiation level of X-ray tubes is set to be weaker for the pre-scan. The pre-scan preparation step 20 is then completed.

The contrast medium is then injected into a blood vessel of the subject body so that the pre-scan operation 30 starts. Upon receipt of the threshold values, the image reconstruction unit 1 perform formation 31 of the CT reference image from data collected through the pre-scan, calculation 32 of average CT values in the ROI, and elimination 40 of pixels which have higher and lower values than the threshold from the image data. Such processed data is provided to the monitor unit 6 through the display control unit 5. The monitor unit 6 displays the reference image in which tho internal carotid arteries are emphasized because the bones and air have been already removed from the original reference image.

Figure 5A:
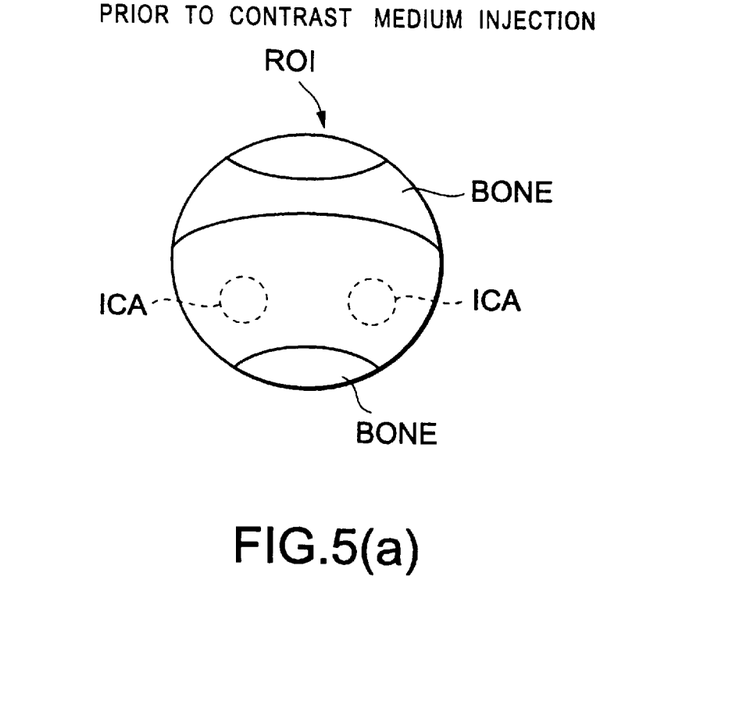
FIGS. 5(a) and 5(b) show a ROI CT image and its characteristic diagram before a contrast medium is injected into blood vessels, respectively.
Figure 5B:
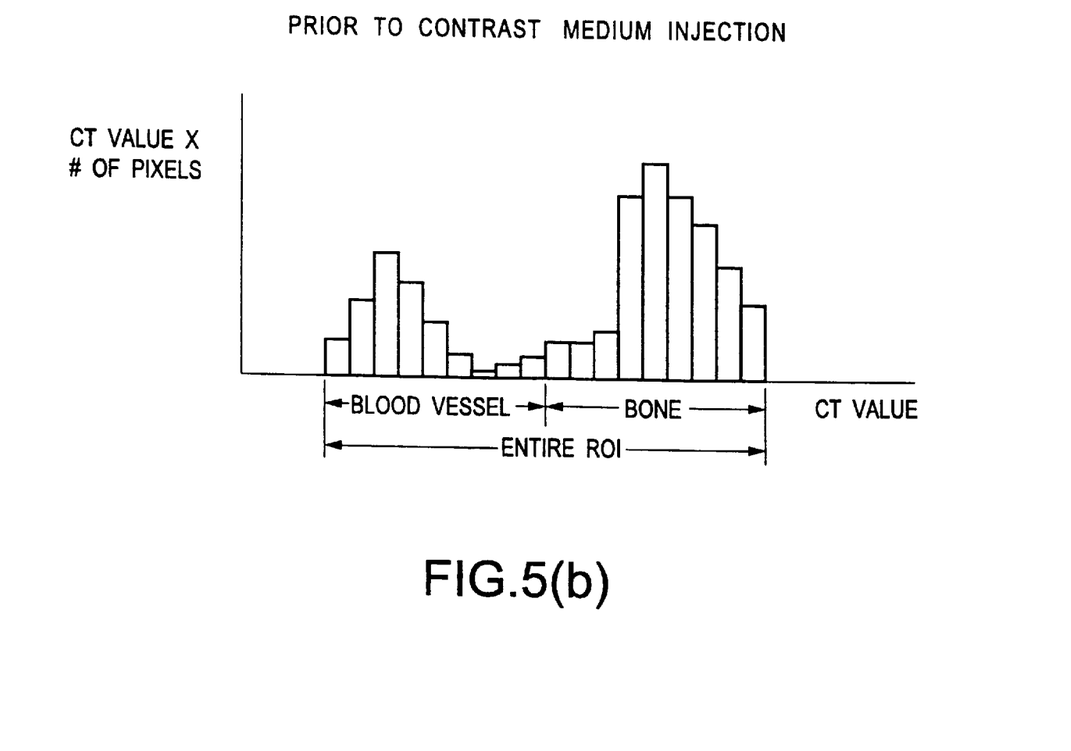

In further detail, the reference image in the ROI consists of blood vessels and bone as shown in FIG. 5(a), for instance, in which the latter has a higher CT value than the former as shown in FIG. 5(b). The image shows situations prior to the injection of the contrast medium into the blood vessels.

Figure 5C:
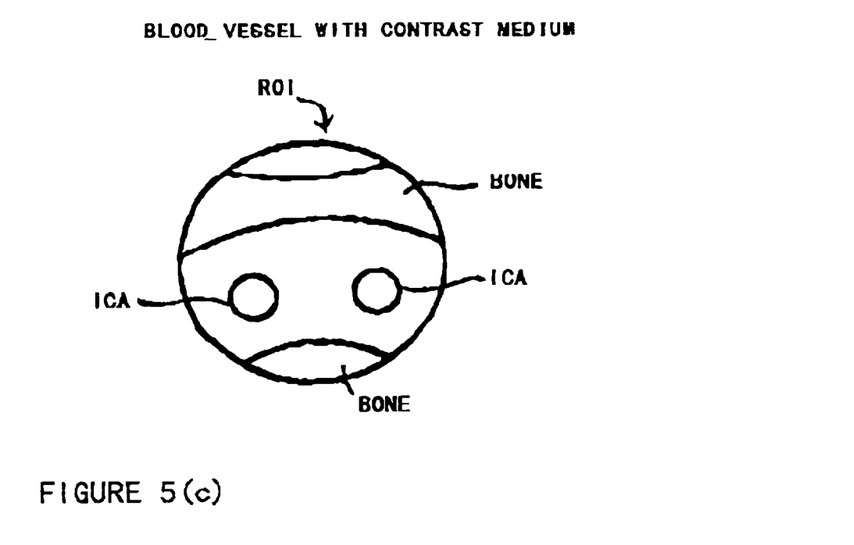
FIGS. 5(c) and 5(d) show the ROI CT image and its characteristic diagram after a contrast medium has been injected into the blood vessels, respectively.
Figure 5D:
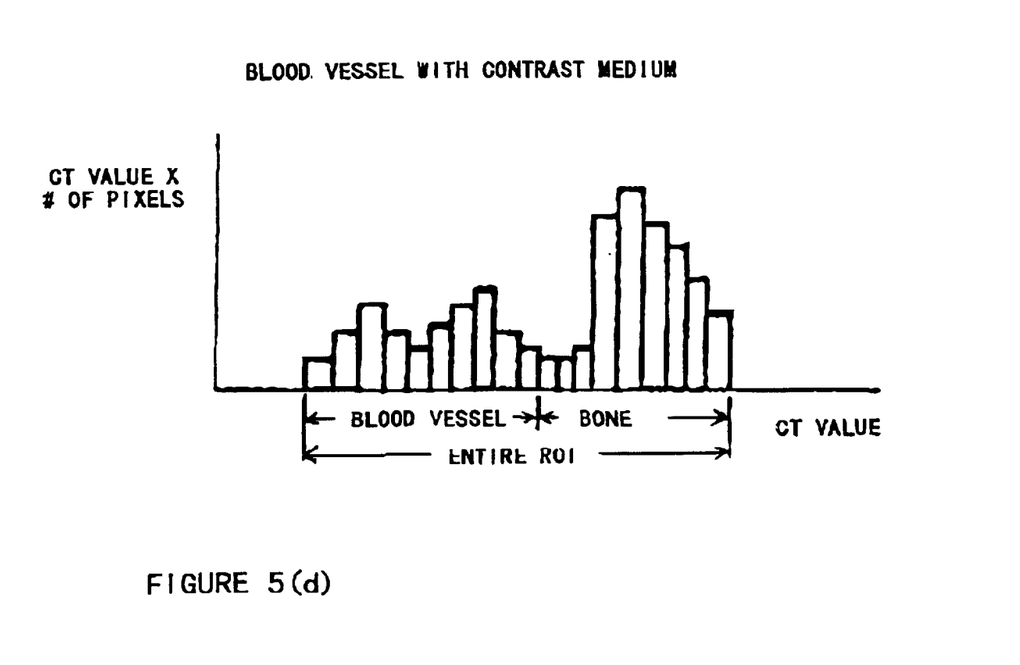
Figure 6A:
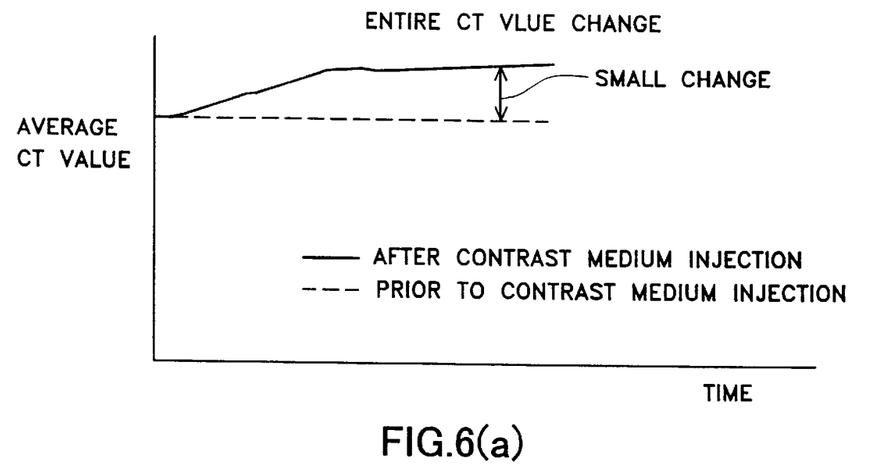
FIGS. 6(a) and 6(b) show ROI CT-value changes of an entire object image and blood vessels in the lapse of time, respectively, before and after injection of a contrast medium into blood vessels.
Figure 6B:
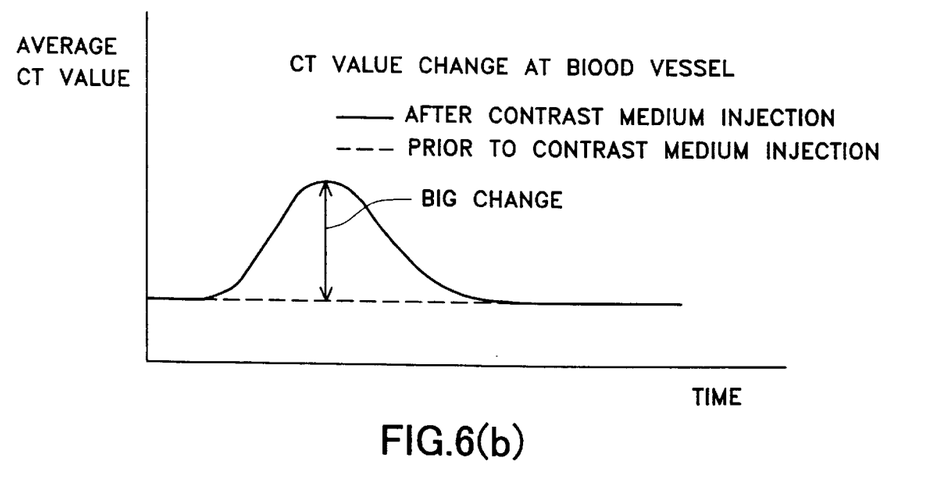

When the medium is injected into the blood vessels, the image and the CT values of the blood vessels are changed as shown FIGS. 5(c) and 5(d), respectively. As shown in FIG. 6(a), in the case where the CT value changes of the bones and blond vessels are taken into consideration, the CT values before and after the medium is injected, do not show a significant difference However, as far as the blood vessel CT values are concerned, a large difference of the CT values exists between them as shown in FIG. 6(b). In FIG. 6(b), a dotted line represents a CT value change in the lapse of time before the contrast medium is injected into the blood vessels, while a solid line indicates a sharp CT value change in the same after the medium is injected.

If the bone and air components are removed from the reference image based upon the bone CT values and the ROI image is processed, the modified reference image with emphasis on the internal carotid arteries (ICA) can be displayed on the monitor unit 6. In this embodiment, clear observations can be made on fine blood vessels in a portion, such as a human head where bones and blood vessels are tangled with each other. When a contrast medium is injected into the blood vessels, observations of a ROI bring about a precise judgment as to whether the medium reaches the internal carotid arteries.

After judging the medium completely reaches the arteries, the operator provides an instruction to the X-ray CT apparatus to start the ordinary photographing operation 50 (FIG. 1). As a result, useful CT images for diagnosis can be obtained with less X-ray irradiation. Since the subject body is exposed to less X-ray radiation, the safety of the X-ray CT apparatus can be improved remarkably.

According to a modified embodiment, if a patient does not substantially move, subtraction operation 33 with respect to collected ROI pixel data and a stored corresponding pixel data, calculation 37 of average CT values based on a subtraction result and comparison 40 of tho average CT value with a threshold value may be carried out as shown in FIG. 7.

Alternatively, in the case where CT values are entered as the threshold values to remove blood vessels with the contrast medium from a ROI image, the image reconstruction unit 1 removes from the image data indicative of the reference image pixels data which have lower CT values than those of the blood vessel with the contrast medium. The image reconstruction unit 1 provides its output data to the monitor 6 through the display control unit 5. Thus, the X-ray CT apparatus can display an image basically including bone components as a reference image and observe tiny bones, for instances. It may contribute to diagnosis for fracture of bones even in a small region.

It is a still further technical problem that an image to be displayed is blurred when a subject body moves during photographing of an object in a ROI. According to the present invention, tolerable margins can be set up for such possible movement against CT values of bones and the like in the X-ray CT apparatus.

An operator manipulates the input data entry unit 3 to set desired margins for CT values of bones as shown in FIGS. 6(a) and 6(b) in the case of such movement. In response to the set margins, the system control unit 4 controls the image reconstruction unit 1 to modify the ROI in such a way that the reconstruction unit 1 removes the pixels with values which are smaller than or equal to the total amount of the threshold values of bones and the tolerable margins from the ROI image.

As another method of securing margins, a low pass image filter may be applied to the reference image. Because of the low pass image filter, the ranges of bone and air are virtually enlarged 80 that the enlarged components become the margins. The enlarged components can be controlled by setting the intensity of the low pass image filter. Due to the margins set in the above, mentioned ways, the monitor unit 6 can clearly display the modified ROI image even in the case that the body moves during the observation of the image.

Next, an accurate judgment for the density of a contrast medium flowing in blood vessels should be made in accordance with changes of color indicative of the contrast medium in a ROI. For that purpose, it is necessary to display the ROI image with constant sensitivity.

Figure 9A:
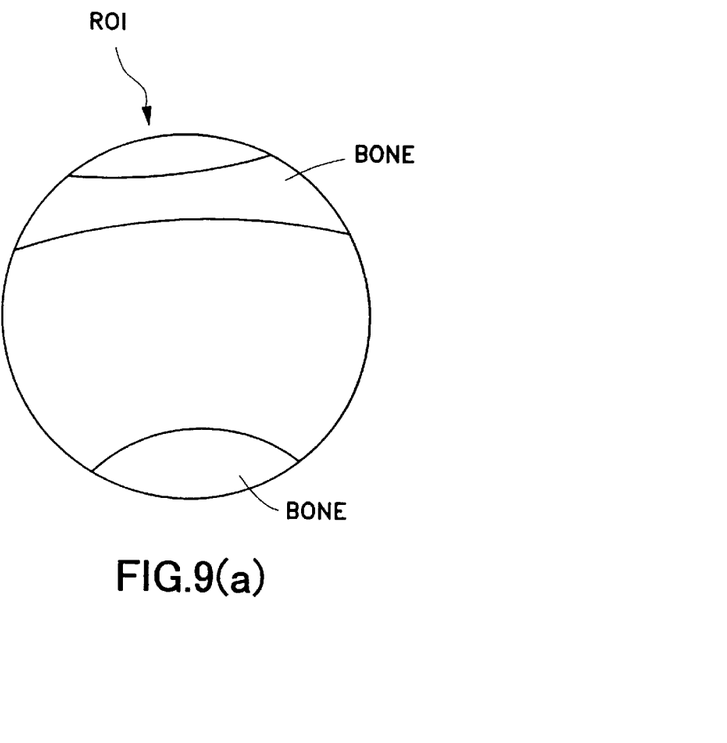
FIGS. 9(a) and 9(b) are diagrams to explain operations of the ROI images with a constant near of pixels.
Figure 9B:
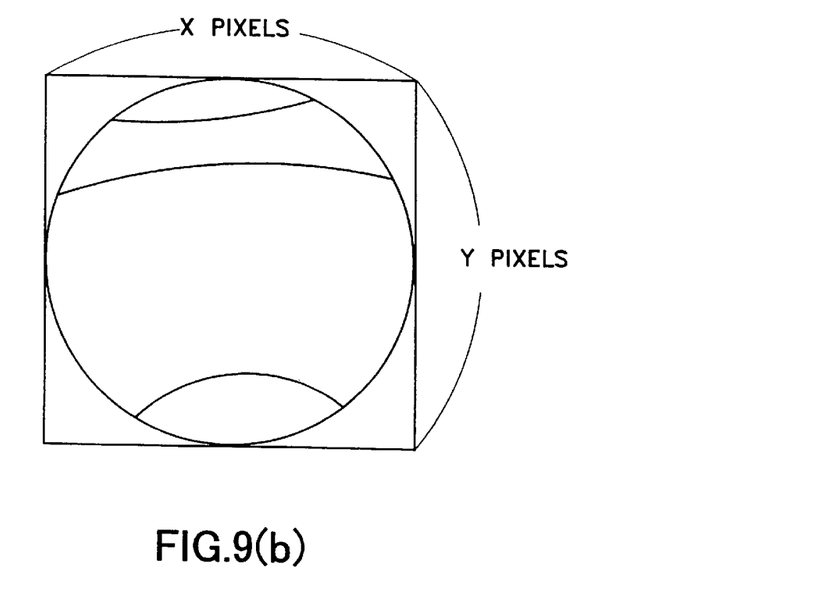

In order to achieve such a function the system control unit 4 of the X-ray CT apparatus keeps the number of pixels (X pixels×Y pixels) in a ROI image fixed as shown in FIGS. 9(a) and 9(b) when the ROI is set up.

Figure 10:
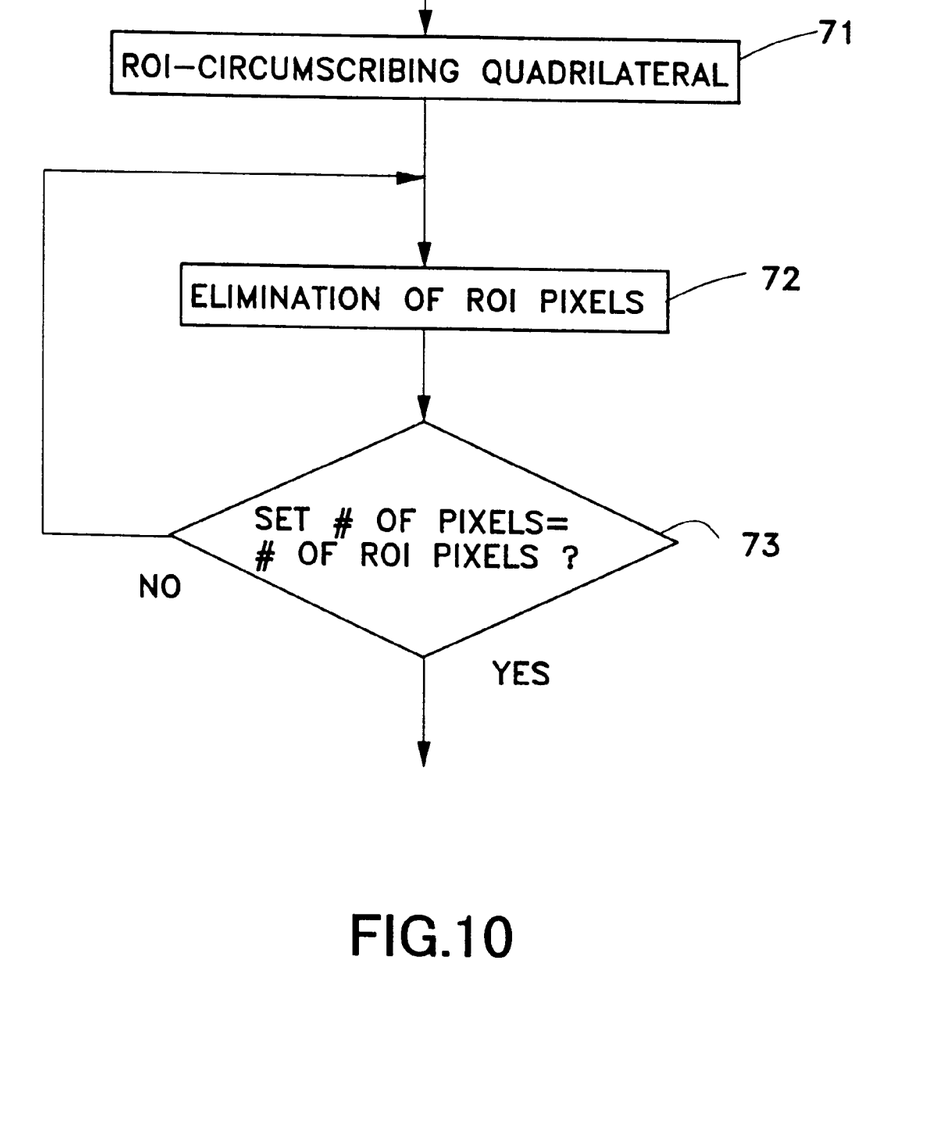
FIG. 10 is an operation flow chart of another embodiment of the invention.

Concretely, the system control unit 4 controls the monitor unit 6 to indicate a message "Please make the ROI size smaller" in a case the ROI set size is more than 1,000 pixels, for instance. Conversely, the monitor unit 6 is controlled to indicate another message such as "Please make the ROI size larger" in case the ROT set size is less than 1,000 pixels. After viewing the messages, the operator tries again to set up the ROI size of 1,000 pixels. As another related embodiment, after a square circumscribing the ROI in a reference image is set in a step 71, elimination 72 of the ROI pixels from the reference image pixels, and comparison 73 of the ROI pixel number with a predetermined pixel number may be executed as shown in FIG. 10 to make the sensitivity constant.

In this way, display control operations can be made to display a ROI image with a constant number of pixels so that the monitor unit 6 can display images with the sensitivity thereof kept constant. Thus, operators observing images displayed on the monitor unit 6 can learn a variety of situations of images with constant sensitivity and make a appropriate judgment of the existence of a contrast medium.

Therefore, the photographing of a tomographic image can be performed with a more accurate timing.

The embodiments of this invention are only directed to X-ray CT apparatus by way of examples. A medical image forming apparatus of the present invention is applicable to any medical image forming apparatus in which a ROI is set up for a photographed image, such as an MRI apparatus. In the case of a magnetic resonance imaging apparatus, proton values are utilized as threshold values and an image forming unit in place of the image reconstruction unit 1 may define a ROI in accordance with the proton values.

Further, according to the embodiments set forth above, the operator enters threshold values and tolerable margin data into the input data entry unit for calculation of a ROI but other systems are available. A table storing the data, for instance, is provided for a set-up ROI and each control and display may be carried out with reference to the table once a ROI has been set up. Obviously, numerous modifications and variations of the present invention are possible in light of the above teaching. It is therefore to be understood that within the scope of the appended claims, the invention may be practiced otherwise than as specifically described herein.

A medical image forming apparatus of the present invention can form a clear ROI image even in portions complicatedly tangled with bones, blood vessels and the like in a human head and the like.

What is claimed as new and is desired to be secured by Letters Patent of the United States is:

1. A medical image forming apparatus, comprising:
   a monitor unit which displays a medical image;
   an input data entry unit which sets a region of interest in the medical image and which sets threshold values to eliminate unnecessary portions from the medical image; and
   a display control unit which modifies the region cut interest image to eliminate unnecessary portions from the region of interest in the medical image in accordance with the threshold values set in said input data entry unit and which supplies the modified region of interest image to said monitor unit.

2. The medical image forming apparatus according to claim 1, further comprising:
   a reconstruction unit which reconstructs the medical image based on input data; and
   a system control unit which controls said monitor unit, said display control unit, and said reconstruction unit in accordance with the data set in said input data entry unit.

3. A medical image forming apparatus, comprising:
   means for displaying a medical image;
   means for setting a region of interest in the medical image;
   means for setting threshold values to eliminate unnecessary portions from the medical image; and
   image forming means for modifying the region of interest image to eliminate unnecessary portions from the region of interest image in accordance with the threshold values and for supplying the modified region of interest image to said display means.

4. A medical image forming apparatus, comprising:
   means for injecting a contrast medium into a subject body;
   means for X-ray photographing a diagnostic image of the subject body;
   means for displaying the diagnostic image;
   means for setting a region of interest in the diagnostic image;
   means for setting threshold values to eliminate unnecessary portions from the region of interest;
   means for eliminating the unnecessary portions from the region of interest image to form a modified image in accordance with the threshold values and for providing the modified image to said displaying means; and
   means for providing a start instruction to start a photographing operation in response to a predetermined density of the contrast medium in the region of interest displayed by said displaying means.

5. The medical image forming apparatus according to claim 4, further comprising:
   means for controlling said means for X-ray photographing to irradiate a less quantity of X-rays than an ordinary quantity thereof until the start instruction is provided by said means for providing and for irradiating the ordinary quantity of X-rays when the start instruction is provided thereby.

6. The medical image forming apparatus according to claim 3, further comprising:
   means for setting margins of the threshold values set by said threshold setting means.

7. The medical image forming apparatus according to claim 4, further comprising:
   means for setting margins of the threshold values set by said threshold setting means.

8. The medical image forming apparatus according to claim 5, further comprising:
   means for setting margins of the threshold values set by said threshold setting means.

9. The medical image forming apparatus according to claim 3, further comprising:
   means for controlling pixels in the region of interest to make said pixels constant in number.

10. The medical image forming apparatus according to claim 4, further comprising:
    means for controlling pixels in the region of interest to make said pixels constant in number.

11. The medical image forming apparatus according to claim 5, further comprising:
    means for controlling pixels in the region of interest to make said pixels constant in number.

12. The medical image forming apparatus according to claim 6, further comprising:
    means for controlling pixels in the region of interest to make said pixels constant in number.

13. A computer tomography apparatus, comprising:
    means for injecting a contrast medium into a subject body;
    means for photographing a tomographic image of the subject body;
    means for displaying the topographic image;
    means for setting a region of interest in the tomographic image;
    means for setting threshold values to eliminate unnecessary portions from the region of interest;
    means for eliminating unnecessary portions from the region of interest to form a modified tomographic image in accordance with the threshold values and for providing the modified tomographic image to said display means; and
    means for providing a start instruction to start a photographing operation in response to a predetermined density of the contrast medium in the region of interest displayed by said displaying means.

14. The computer tomography apparatus according to claim 13, further comprising:

means for controlling said photographing means to irradiate a less quantity of X-rays than an ordinary quantity thereof until the start instruction is provided by said means for providing and for irradiating the ordinary quantity of X-rays when the start instruction is provided thereby.

15. A method of forming a medical image, comprising the steps of:

injecting a contrast medium into a subject body;

X-ray photographing a diagnostic image of the subject body;

displaying the diagnostic image;

setting a region of interest in the diagnostic image;

setting threshold values to eliminate unnecessary portions from the region of interest;

eliminating the unnecessary portions from the region of interest to form a modified image in accordance with the threshold values;

displaying the modified image; and providing a start instruction to start a photographing operation to a predetermined density of the contrast medium in the modified image.

16. The method according to claim 15, wherein the step of X-ray photographing irradiates a less quantity of X-rays than an ordinary quantity thereof until the start instruction is provided and irradiates the ordinary quantity of X-rays when the start instruction is provided.

17. The method according to claim 15, further comprising the steps of:

setting margins of the threshold values set by said step of setting threshold values.

18. The method according to claim 15, further comprising the step of:

controlling pixels in the region of interest to make the pixels constant in number.

* * * * *